(12) United States Patent
Yeh et al.

(10) Patent No.: US 7,688,195 B2
(45) Date of Patent: Mar. 30, 2010

(54) BRIDGE SYSTEM FOR INSTALLING ELECTRONIC APPLIANCE TO LIGHT SOURCE SOCKET AND BRIDGE METHOD THEREOF

(75) Inventors: Benjamin Yeh, Taipei (TW); Yen-Ju Hsu, Taipei (TW)

(73) Assignee: Sercomm Corporation, Taipei (TW)

( * ) Notice: Subject to any disclaimer, the term of this patent is extended or adjusted under 35 U.S.C. 154(b) by 351 days.

(21) Appl. No.: 11/822,753

(22) Filed: Jul. 10, 2007

(65) Prior Publication Data
US 2009/0015396 A1 Jan. 15, 2009

(51) Int. Cl.
*H04Q 1/30* (2006.01)
(52) U.S. Cl. .................. 340/538.17; 340/500; 340/541; 340/310.11; 362/86
(58) Field of Classification Search ............ 340/538.17, 340/500, 531, 533, 541, 565, 310.11, 310.16, 340/310.18
See application file for complete search history.

(56) References Cited

U.S. PATENT DOCUMENTS

| | | | | |
|---|---|---|---|---|
| 5,432,500 A | * | 7/1995 | Scripps | .................. 340/310.11 |
| 5,980,057 A | * | 11/1999 | Christie | ........................ 362/86 |
| 6,324,311 B1 | * | 11/2001 | Gann | ........................ 382/312 |
| 6,696,971 B2 | * | 2/2004 | Tukin | ....................... 340/693.5 |
| 6,812,970 B1 | * | 11/2004 | McBride | ...................... 348/372 |
| 7,339,466 B2 | * | 3/2008 | Mansfield et al. | ....... 340/310.11 |
| 7,455,435 B2 | * | 11/2008 | Mathews et al. | ............. 362/441 |
| 7,576,659 B2 | * | 8/2009 | Lax | .............. 340/628 |
| 2003/0197807 A1 | * | 10/2003 | Wu | .................. 348/375 |
| 2003/0210340 A1 | * | 11/2003 | Frederick Romanowich | ..... 348/272 |
| 2007/0274532 A1 | * | 11/2007 | Adachi et al. | ........... 340/310.11 |

* cited by examiner

*Primary Examiner*—Eric M Blount
(74) *Attorney, Agent, or Firm*—Thomas, Kayden, Horstemeyer & Risley

(57) ABSTRACT

A bridge system for installing electronic appliance to light source socket and a bridge method are disclosed. The system includes a light source plug, a power line communication module and a connection unit. The light source plug is electrically connected to the light source socket to perform data communication through the power lines. The power line communication module is electrically connected to the light source plug to convert AC power into DC power and perform analog-to-digital data conversion simultaneously through the power lines. The connection unit is electrically connected to the electronic appliance to provide AC or DC power and transmit converted digital data to the electronic appliance. Accordingly, there is no need to add power cables or power adapters.

17 Claims, 5 Drawing Sheets

BRIDGE SYSTEM FOR INSTALLING ELECTRONIC APPLIANCE TO LIGHT SOURCE SOCKET AND BRIDGE METHOD THEREOF

FIELD OF THE INVENTION

The present invention generally relates to a bridge system for installing electronic appliance to light source socket and bridge method thereof, and more specifically relates to the bridge system that utilizes a light source plug in combination with a power line communication module which includes a power converter for converting AC power into DC power to provide a specific Ethernet interface having DC or AC power pins and to achieve the goal of data transmission and power supply functions simultaneously.

BACKGROUND OF THE INVENTION

In home monitoring and automation systems, various devices such as motion sensors, cameras, or speakers are often installed at a higher portion of the wall or at the ceiling to provide a better view or audio effect. However, the AC (alternating current) power sockets are usually disposed at a lower portion of the wall to make the power sockets inconspicuous. Therefore, to retrieve power, those devices higher up need to be connected to the power sockets (power outlets) through power cable which may be exposed to damage or be dangled outside, usually visually unattractive and against electrical regulation codes. If users try to hide the wiring and power cables behind the wall, through electric wire conduits according to the electric regulations, it will be labor intensive and costly to implement.

Moreover, for devices require data transmission through the Ethernet cable, such as network cameras and other IP-based devices, the Ethernet connector jack usually only provides data transmission function for the devices. It may need a separate power cable or power adapter for supplying AC or DC (direct current) power to the devices. This extra data transmission cable is to add another wiring issue and cause great inconvenience.

To overcome the foregoing shortcomings, the inventors of the present invention based on years of experience in the related field to conduct extensive researches and experiments, and finally invented a bridge system for installing electronic appliance to light source sockets and bridge method thereof, as a method or a basis for resolving the foregoing drawbacks.

SUMMARY OF THE INVENTION

Briefly, it is a primary object of the present invention to provide a bridge system for installing at least one electronic appliance to a light source socket.

To achieve the foregoing object of the present invention, the system comprises a light source plug, a power line communication module and a connection unit. The light source plug is plugged into the light source socket to perform data communication and to retrieve AC power through the power sockets. The power line communication module is electrically connected to the light source plug to convert AC power into DC power and perform analog-to-digital data conversion simultaneously through the power lines. The connection unit is electrically connected to the electronic appliance to provide AC or DC power, and transmit digital data between the electronic appliance and this bridge unit. In addition, the electronic appliance can also receive AC power from the power lines through the connection unit of the bridge system.

The electronic appliance herein can be a motion sensor, an image capture device, a speaker or any electronic appliance. For example, the image capture device can be a camera or a camcorder. The power line communication module herein further has a printed circuit board (PCB) for a power-line communication chip, a power converter for implementing power conversion, a support board for the power converter, a memory for temporarily storing data, a PCB support pole and at least one appliance latch and contact wires. The connection unit can be a connector that is applied for a network such as Ethernet. Furthermore, the connection unit can also perform both AC or DC power supply and analog-to-digital data upon the power lines so as to transmit data and supply AC or DC power to the electronic appliance.

Both the power source and the higher position are provided to adequately install the electronic appliances such as speakers, video cameras or displays through the light source sockets. Some good examples include the light bulb sockets for "motion lights" located outside the garage gate, or the light bulb sockets for lamps to enlighten the backyard. Further, the design of the converter of the power-line communication module can directly supply AC power or to convert the AC power into DC power to the electronic appliance through the connection unit without adding additional cables or power adapters.

Another object of the present invention is to provide a bridge method for installing at least one electronic appliance to a light source socket. The method comprises the following steps of:

(a). Plugging a light source plug into the light source socket to perform data communication through power lines;

(b). Electronically connecting a power line communication module and the light source plug to convert AC power into DC power and perform analog-to-digital data conversion simultaneously through the power lines; and (c). Utilizing a connection unit to electrically connect the power line communication module to transmit converted digital data and supply AC or DC power to the electronic appliance.

To make it easier for our examiner to understand the object of the invention, its innovative features and performance, a detailed description and technical characteristics of the present invention are described together with the drawings as follows.

DETAILED DESCRIPTION OF THE PREFERRED EMBODIMENTS

Figure 1:
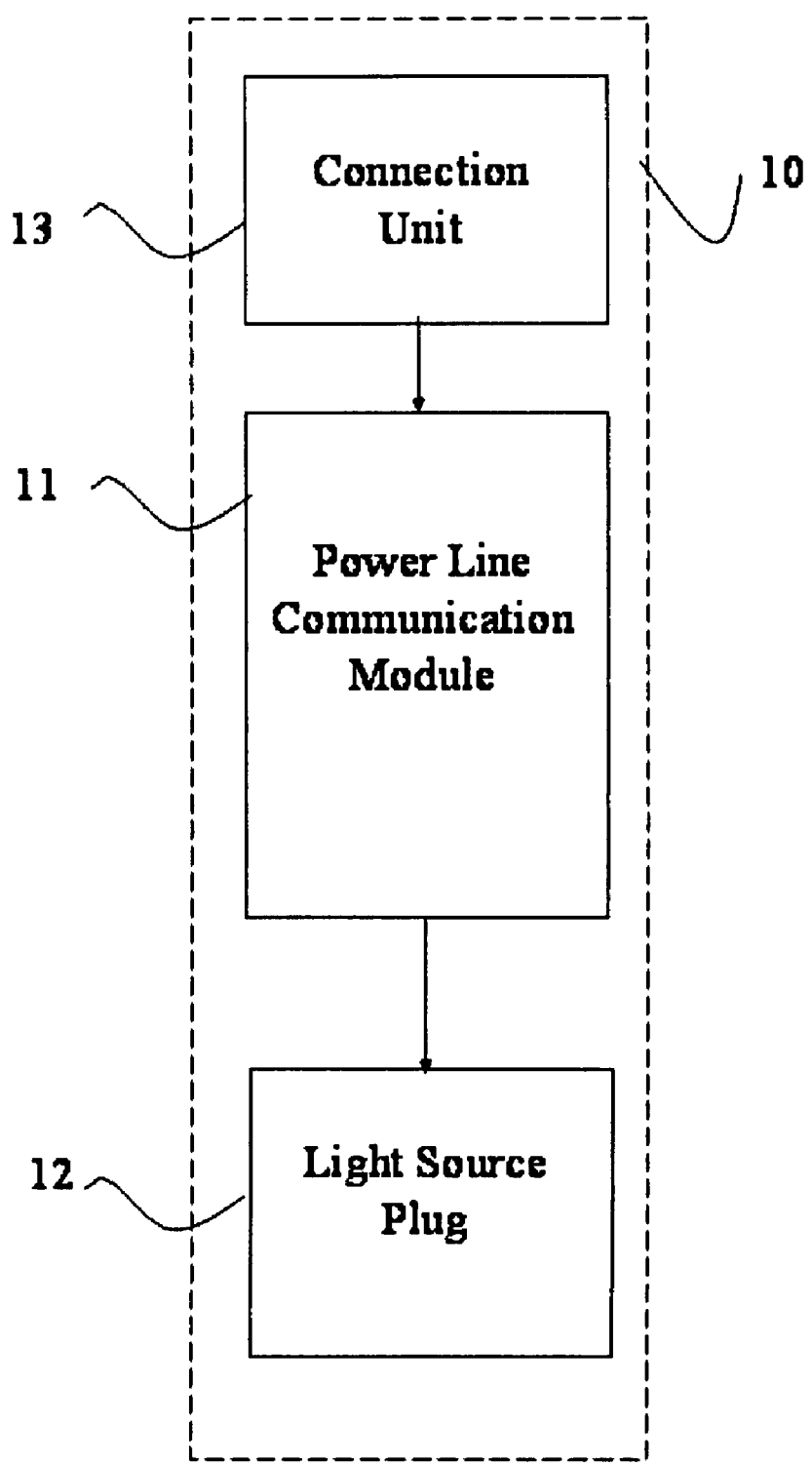
FIG. 1 is a block diagram of a bridge system for installing an electronic appliance to a light source socket of the invention.

Referring to the related figures for the bridge system for installing electronic appliance to light source socket and bridge method thereof according to a preferred embodiment of the present invention, wherein the same elements are described by the same reference numerals.

Referring to FIG. 1 for the block diagram of a bridge system for installing an electronic appliance to a light source socket of the invention is illustrated. The bridge system 10 comprises a light source plug 12, a power line communication module 11 and a connection unit 13. The light source plug 12 is plugged into the light source socket (not shown) to perform data communication through power lines. The power line communication module is electrically connected to the light source plug 12 to convert AC power into DC power and perform analog-to-digital data conversion simultaneously through the power lines. The connection unit 13 is electrically connected to the electronic appliance (not shown) to provide AC or DC power and transmit converted digital data to the electronic appliance. Moreover, converted DC power from the power lines is not only provided to the power line communication module 11; but is also supplied to the electronic appliance through the connection unit 13 of the bridge system 10. In addition, the electronic appliance can also receive AC power from the power lines through the connection unit 13 of the bridge system.

The electronic appliance is preferably a motion sensor, an image capture device or a speaker. Moreover, the image capture device is preferably a camera or a camcorder. The power line communication module 11 further comprises a printed circuit board (PCB) for a power line communication chip, a power converter for implementing power conversion, a support board for the power converter, a memory for temporarily storing data, a PCB support pole and at least one appliance latch and contact wires. The contact wires are preferably AC wires, and the appliance latch is used to latch the electronic appliance. The power line communication module 11 can be accommodated in a housing. Additionally, the connection unit 13 is preferably a connector that is applied for a network (herein is preferably Ethernet) and AC or DC power supply so as to satisfy the data transmission and power supply functions.

Figure 2:
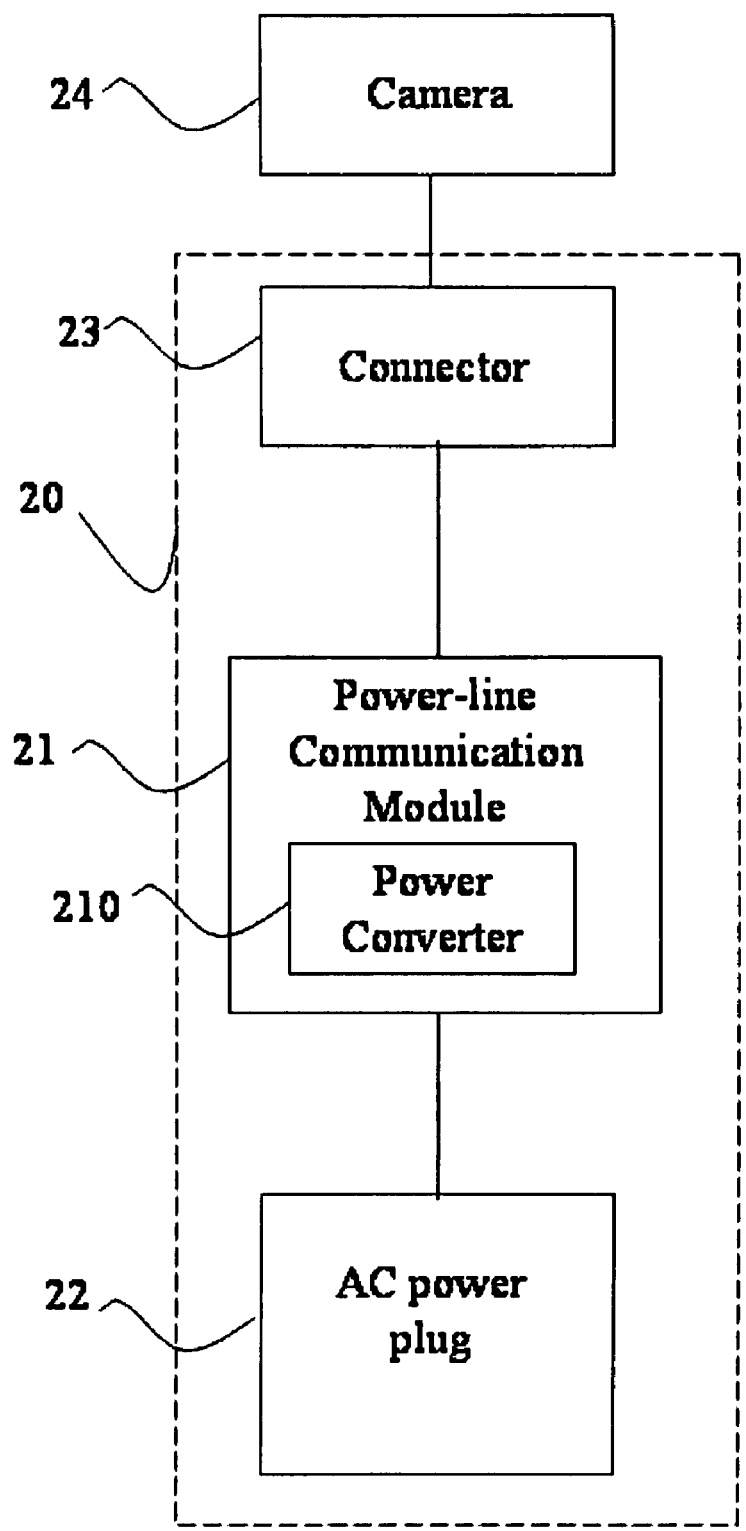
FIG. 2 is a detail block diagram of a bridge system for installing at least one camera to a light bulb socket according to a preferred embodiment of the invention.

Referring to FIG. 2 for the detail block diagram of a bridge system for installing at least one camera to a light bulb socket according to a preferred embodiment of the invention is illustrated. The bridge system 20 comprises an AC power plug 22 plugged into the light source socket (not shown), a power line communication module 21 electrically connected to the AC power plug 22 and a connector 23. A power converter 210 of the power line communication module 21 converts AC power transmitted from the AC power plug 22 into DC power, and the power line communication module 21 also implements an analog-to-digital conversion. The connector 23 provides data transmission and supplies AC or DC power to the camera 24. Therefore, the camera 24 can implement required action such as image capture.

Figure 3:
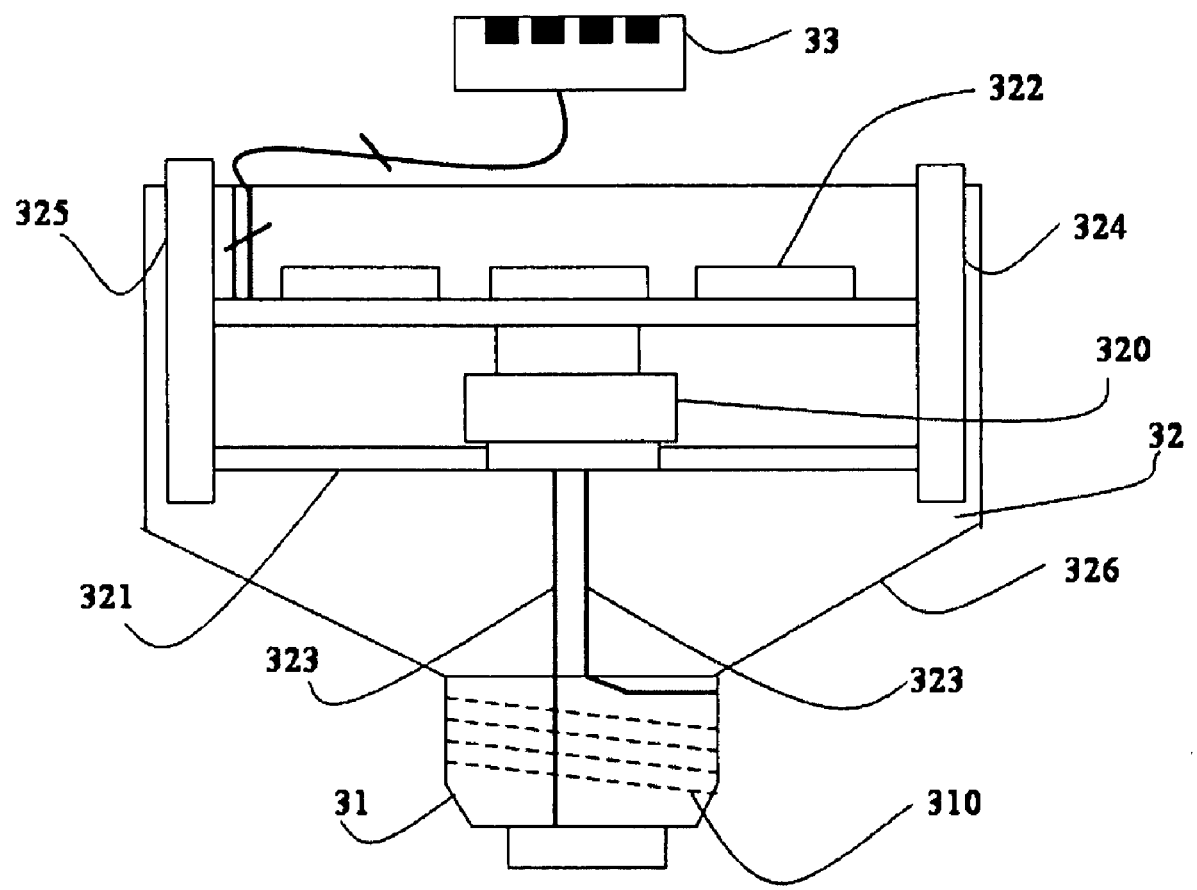
FIG. 3 is a schematic diagram of a bridge system according to a preferred embodiment of the invention.

Referring to FIG. 3 for the schematic diagram of a bridge system according to a preferred embodiment of the invention is illustrated. The system 30 includes a light source plug 31, a power line communication electronic module 32 and an Ethernet and power connector 33, wherein the power-line communication electronic module 32 can be screwed or plugged into the light source plug 31. The dotted lines 310 distributed on the external wall of the light source plug 31 are preferably threads, and the light source plug 31 can be plugged and screwed into the light source socket (not shown) through the threads and internal threads of the light source socket. The light source socket, such as the Medium Edison Screw (MES) E26 lamp fitting, is used in the U.S.A and Japan for most 120 and 100 voltage lamps, and includes all different types of light source sockets. The power line communication electronic module 32 further includes a power converter 320 for converting AC power into DC power, a converter support board 321 for carrying the power converter 320, a PCB 322 for power line communication chip, contact wires 323 and two PCB support pole and device module latches 324 and 325 for securing the electronic appliance, such as the sensor, the camera, the camcorder, the speaker, or other data/multimedia communication devices, with the power line communication electronic module 32. The power line communication electronic module 32 is accommodated in a housing 326. Therefore, data sent from the electronic appliance can be transmitted through the power line communication protocols such as HomePlug® . . . etc. By providing AC or DC power as well as data transmission through the Ethernet and power connector 33, the electronic appliance to be connected will not need the power cable anymore.

Figure 4:
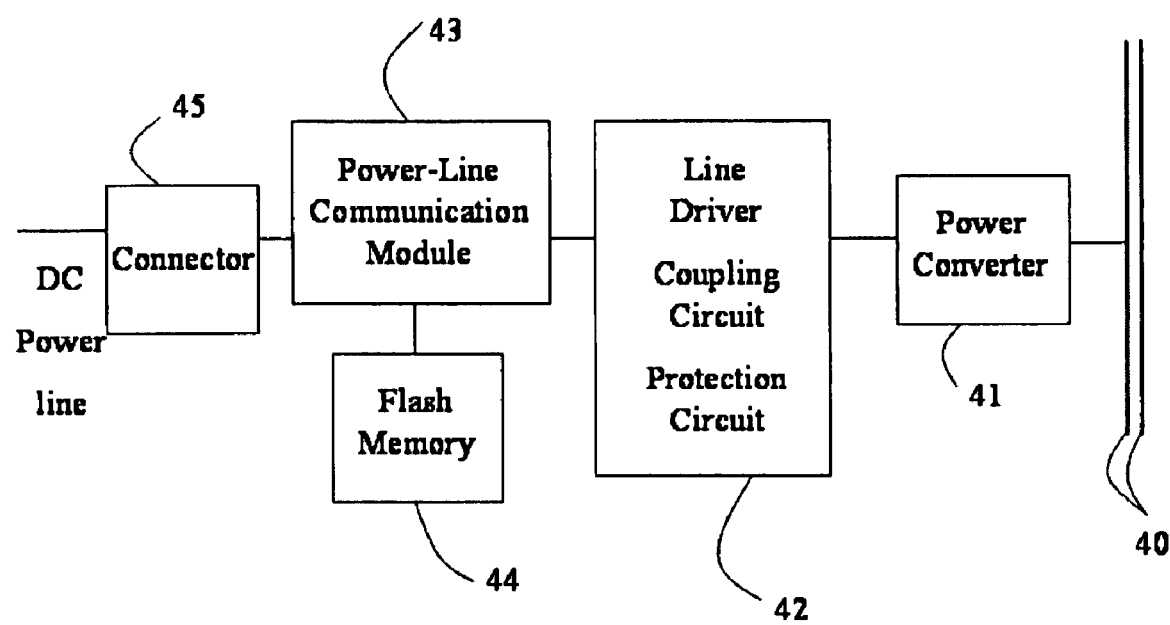
FIG. 4 is a block diagram of a part of the PCB for power-line communication chip of the invention.

Referring to FIG. 4 for the block diagram of a part of the PCB for a power-line communication chip of the invention is illustrated. Two contact wires 40 are used to supply AC power. A power converter 41 (also called transformer) then converts AC power into DC power. A circuit 42 which includes a line driver, a coupling circuit and a protection circuit is used to improve the transmission reliability and increase safety. A power line communication module 43 is the key of the PCB design, and it will include all different types of power line communication modules, not limited by HomePlug®. Amplitude shift keying (ASK) modulation is utilized to design the module so as to transmit data through the power lines. A flash memory 44 is used to temporally store data while in transmission. A connector 45 is capable of linking the electronic appliances, such as speakers, cameras or displays, for data transmission and AC or DC power supply.

Figure 5:
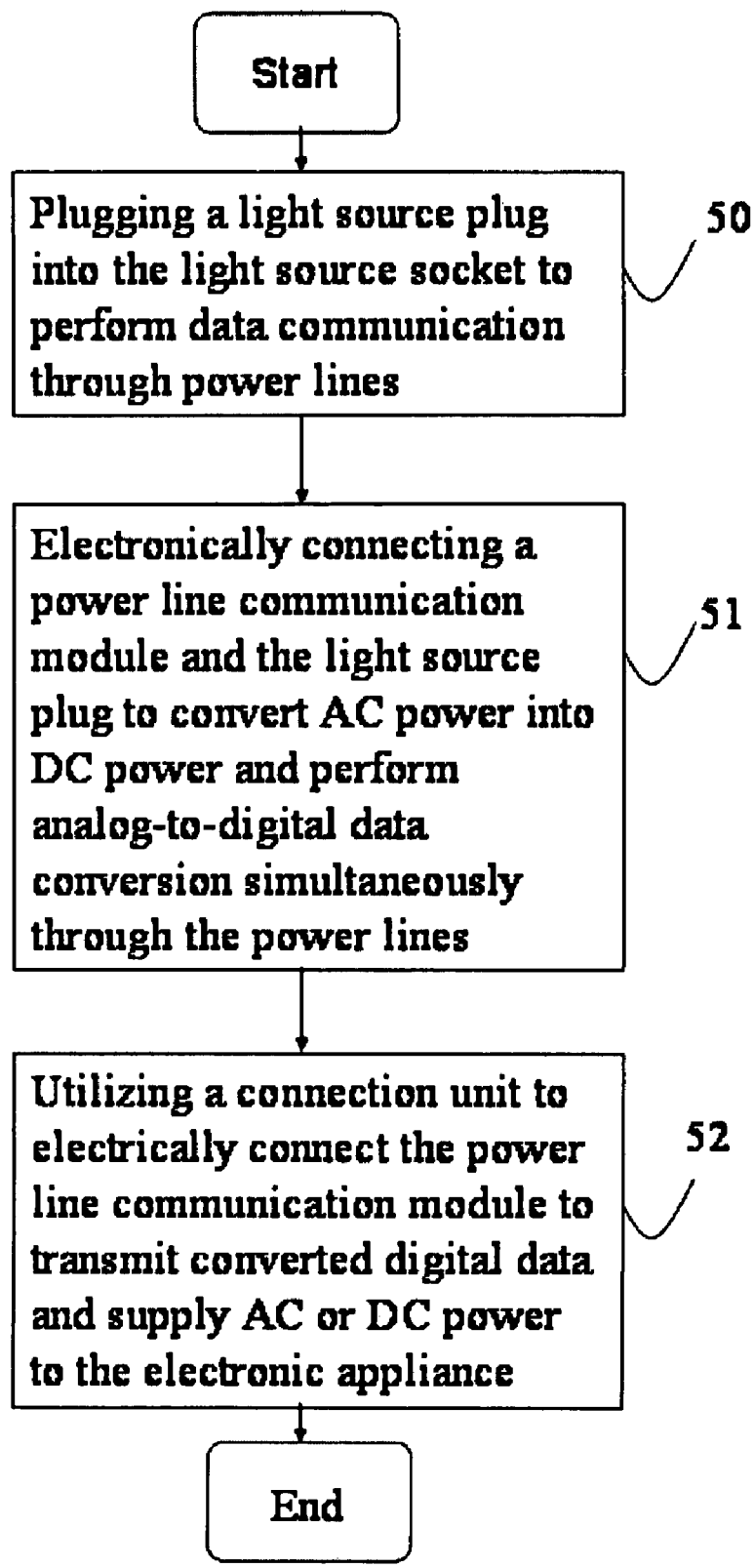
FIG. 5 is a flowchart of a bridge method for installing an electronic appliance to a light source socket of the invention.

Referring to FIG. 5 for the flowchart of a bridge method for installing an electronic appliance to a light source socket of the invention, wherein the method comprises the following steps:

Step 50: Plugging a light source plug into the light source socket to perform data communication through power lines;

Step 51: Electronically connecting a power line communication module and the light source plug to convert AC power into DC power and perform analog-to-digital data conversion simultaneously through the power lines; and Step 52: Utilizing a connection unit to electrically connect the power line communication module to transmit converted digital data and supply AC or DC power to the electronic appliance.

The system and method provide a flexible way to change or swap different front-end electronic appliances, either through the detachment/connection of the composite connector, or through the unscrew of the light source plug. The system and method will greatly simplify the installation and wiring issues for electronic appliances.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A bridge system for installing at least one electronic appliance to a light source socket upon power lines, comprising:

a light source plug plugged into the light source socket for receiving an AC power and performing data communication through the power lines;

a power line communication module electrically connected to the light source plug, and for converting the AC power into an DC power and performing analog-to-digital data conversion simultaneously through the power lines; and a connection unit electrically connected to the electronic appliance to provide the AC power from the power lines and the DC power from the power line communication module to the electronic appliance and transmit converted digital data to the electronic appliance.

2. The bridge system of claim 1, wherein the electronic appliance is a motion sensor, an image capture device, or a speaker.

3. The bridge system of claim 2, wherein the image capture device is a camera or a camcorder.

4. The bridge system of claim 1, wherein the power line communication module further includes a printed circuit board (PCB) for a power line communication chip, a power converter for implementing power conversion, a support board for the power converter, a memory for temporarily storing data, a PCB support pole and at least one appliance latch and contact wires.

5. The bridge system of claim 4, wherein the contact wires are AC (alternating current) contact wires.

6. The bridge system of claim 4, wherein the appliance latch is used to latch the electronic appliance.

7. The bridge system of claim 1, wherein the power line communication module is accommodated in a housing.

8. The bridge system of claim 1, wherein the connection unit is a connector that is applied for a network and AC or DC power supply.

9. A bridge method for installing at least one electronic appliance to a light source socket upon power lines, comprising:

plugging a light source plug into the light source socket to receive an AC power and perform data communication through the power lines;

electronically connecting a power line communication module and the light source plug to convert the AC power into an DC power and perform analog-to-digital data conversion simultaneously through the power lines; and utilizing a connection unit to electrically connect the power line communication module to transmit converted digital data and supply the AC power from the power lines and the DC power from the power line communication module to the electronic appliance.

10. The bridge method of claim 9, further comprising the step of providing a motion sensor, an image capture device, or a speaker to be the electronic appliance.

11. The bridge method of claim 10, further comprising the step of providing a camera or a camcorder to be the image capture device.

12. The bridge method of claim 9, further comprising the step of providing a PCB for a power line communication chip, a power converter for implementing power conversion, a support board for the power converter, a memory for temporarily storing data, a PCB support pole and at least one appliance latch for securing the electronic appliance and contact wires.

13. The bridge method of claim 12, further comprising the step of providing AC contact wires to be the contact wires.

14. The bridge method of claim 9, wherein the power line communication module is accommodated in a housing.

15. The bridge method of claim 9, further comprising the step of providing a connector to be the connection unit, wherein the connector is applied for a network and AC or DC power supply.

16. The bridge system of claim 1, wherein the power-line communication electronic module is screwed into the light source plug.

17. The bridge system of claim 1, wherein the power-line communication electronic module is plugged into the light source plug.

* * * * *